United States Patent [19]

Morita

[11] Patent Number: 5,042,659

[45] Date of Patent: Aug. 27, 1991

[54] CASE FOR MAGNETIC TAPE CASSETTE

[75] Inventor: Kiyoo Morita, Kanagawa, Japan

[73] Assignee: Fuji Photo Film Co., Ltd., Kanagawa, Japan

[21] Appl. No.: 498,063

[22] Filed: Mar. 23, 1990

[30] Foreign Application Priority Data

Apr. 6, 1989 [JP] Japan .................................. 1-85673

[51] Int. Cl.[5] .......................................... B65D 85/672
[52] U.S. Cl. .................................... 206/387; 206/493; 220/339
[58] Field of Search ............... 206/309, 310, 312, 387, 206/493; 220/337, 338, 339; 229/9, 10

[56] References Cited

U.S. PATENT DOCUMENTS

| | | | |
|---|---|---|---|
| 3,620,361 | 11/1971 | Fujiwara | 206/387 |
| 3,638,788 | 2/1972 | Solomon | 206/387 |
| 3,732,999 | 5/1973 | Rounkles | 220/338 |
| 4,122,945 | 10/1978 | Borzak | 206/493 |
| 4,140,219 | 2/1979 | Somers | 206/493 |
| 4,314,637 | 2/1982 | Posso | 206/387 |
| 4,627,534 | 12/1986 | Komiyama et al. | 206/387 |
| 4,921,097 | 5/1990 | Finke et al. | 206/387 |

FOREIGN PATENT DOCUMENTS

| | | | |
|---|---|---|---|
| 54-53512 | 4/1979 | Japan | 206/387 |
| 59-90266 | 5/1984 | Japan | 206/387 |

Primary Examiner—David T. Fidei
Attorney, Agent, or Firm—Sughrue, Mion, Zinn, Macpeak & Seas

[57] ABSTRACT

A case for a magnetic tape cassette in which the cassette can be inserted into the casing without having to pay attention to the orientation of the upper and lower faces of the cassette and which can be manufactured with a high efficiency. The cassette includes a casing portion having four walls surrounding on four sides a space of substantially the same configuration and size as the exterior of a magnetic tape cassette. Right and left sides of the casing portion are open to provide insertion openings, each having a shape corresponding to the vertical cross-sectional shape of a side face of the magnetic tape cassette. A pivotally openable lid portion of the casing has a pair of stoppers for retaining the hubs of the cassette and provided on the wall for movement between open and closed positions so as to form part of the wall.

7 Claims, 3 Drawing Sheets

CASE FOR MAGNETIC TAPE CASSETTE

BACKGROUND OF THE INVENTION

The present invention relates to a case for housing a magnetic tape cassette, such as an audio or video type cassette, when the cassette is to be stored or carried.

When a magnetic tape cassette for use in audio equipment or the like is to be stored, the cassette is usually housed in a container case made of a plastic material. The magnetic tape cassette has at its front portion an opening into which a magnetic head of a recording/reproducing device is inserted for recording and reproduction, the magnetic tape being arranged to extend across the opening. The container case prevents dust from intruding into the cassette through this opening and also protects that portion of the magnetic tape positioned at the opening as well as the whole of the cassette.

There are various known shapes and constructions of container cases. For example, a case 30 for an audio magnetic tape cassette 15 as shown in FIG. 3 has a lid portion 33 having a pocket portion 34 for receiving a front portion 18 of the magnetic tape cassette 15, and a casing portion 35 having a pair of projections (stoppers) 37 which are adapted to be inserted into respective shaft insertion holes 16 of the magnetic tape cassette 15 so as to prevent the rotation of a pair of hubs 17 on which the magnetic tape is wound.

Pivot pins 39, formed respectively on inner sides of right and left walls of the casing portion 35, are engaged in respective holes 40 formed in respective right and left walls of the pocket portion 34. With this arrangement, the casing portion 35 and the lid portion 33 can be opened and closed relative to each other in the manner of a door.

Further, retainer projections 41 are provided on the casing portion 35, and the lid portion 33 has engaging holes 42 in which respective ones of the retainer projections 41 are engageable, thus preventing the casing portion 35 and the lid portion 33 from being accidentally opened with respect to each other when the two are in a closed condition.

When the magnetic tape cassette is to be placed in the container case 30, the lid portion 33 is opened and the front portion 18 of the magnetic tape cassette 15 is inserted into the pocket portion 34. Thereafter, the lid portion 33 is closed. At this time, if the magnetic tape cassette is incorrectly inserted in such a manner that the directions of the front and rear of the cassette are reversed, the rotation prevention projections 37 fail to be brought into registry with the respective shaft insertion holes 16, which results in a disadvantage that the cassette cannot be properly inserted into the container case.

Further, the container case 30 is assembled by engaging the pivot pins 39 in the respective holes 40 so that it can be opened and closed like a door. This method of assembly has been the cause of low productivity.

SUMMARY OF THE INVENTION

An object of the present invention is to solve the above problems and to improve the handling efficiency of a magnetic tape cassette case and its productivity.

The above and other objects of the invention have been achieved by a case for a magnetic tape cassette having a casing portion having a space surrounded by walls in four directions, this space being generally identical in configuration and size to the exterior of the magnetic tape cassette, right and left sides of the casing portion being open to provide insertion openings each having a shape generally corresponding to the vertical cross-sectional shape of the side face of the magnetic tape cassette, and a pivotally openable lid portion having a pair of stoppers for retaining hubs and provided on the wall for movement between an open and a closed position so as to form part of the wall.

The above and other objects can also be achieved by a cassette case including a casing portion having a space surrounded by a wall in four directions, the space being generally identical in size to the exterior of the magnetic tape cassette, right and left sides of the casing portion being open to provide insertion openings each having a shape generally corresponding to the vertical cross-sectional shape of the side face of the magnetic tape cassette, and a lid portion having a pair of stoppers for retaining hubs and provided on the wall so as to form part of the wall, the lid portion being releaseably attached t the wall.

DESCRIPTION OF THE PREFERRED EMBODIMENTS

Preferred embodiments of the present invention will now be described in detail.

Figure 1:
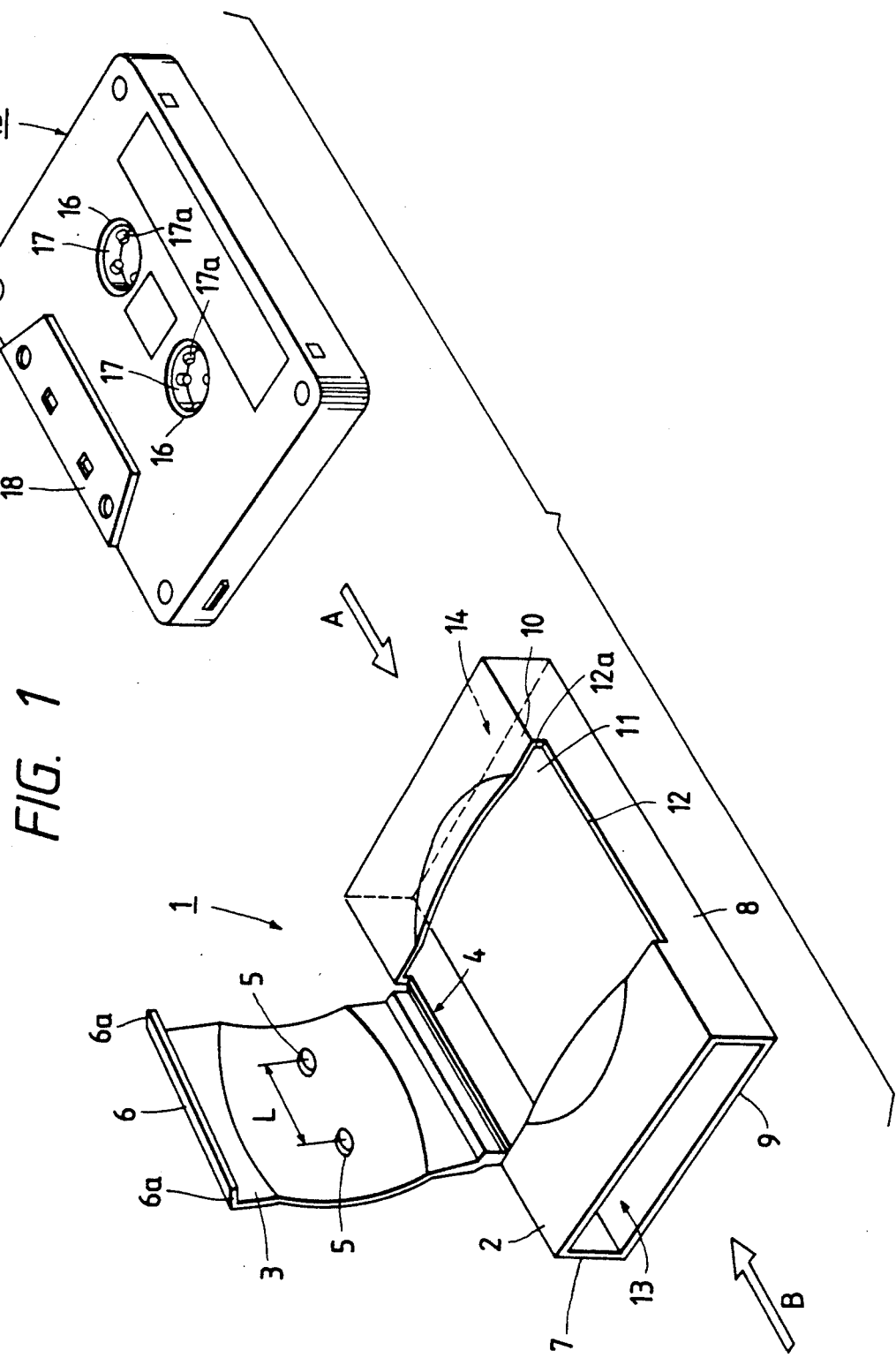
FIG. 1 is a perspective view of a first preferred embodiment of a cassette case of the present invention showing both a cassette case and a magnetic tape cassette to be housed in the case.

FIG. 1 is a perspective view showing a container case 1 embodying the present invention and a magnetic tape cassette 15 which the case 1 is adapted to receive.

In this embodiment, a casing portion 2 of the container case 1 includes walls 9 and 10 corresponding respectively to the front and rear faces of the magnetic tape cassette 15, and walls 7 and 8 corresponding respectively to the top and bottom faces of the cassette, these four walls jointly forming a space for snugly receiving the magnetic tape cassette 15 so that the cassette 15 will not rattle. The left and right sides of the container case 1 are open to provide openings 13 and 14 for the insertion and removal of the magnetic tape cassette 15, each of these openings having a shape generally corresponding to the vertical cross-sectional shape of the side face of the magnetic tape cassette 15.

A cut-out portion 11 of a rectangular shape is formed in the wall 10, and a lid portion 3 for closing the cut-out portion 11 is provided on one end edge of the cut-out portion 11 through a hinge portion 4 so as to be movable between an open and a closed position. Two juxtaposed stoppers 5 are projectingly formed on the inner surface of the lid portion 3 and disposed generally centrally of the width of the casing portion 2, the stoppers 5 being spaced from each other along the length of the casing portion 2. The stoppers 5 are engageable with respective hubs 17 of the magnetic tape cassette 15 to prevent them from turning.

A free end edge 6 of the lid portion 3 is bent in the direction of closing of the lid portion 3 and is suitably engageable with an end edge 12 remote from the hinge portion 4 or a portion near the edge 12 so as to provisionally retain the lid portion 3.

The distance L between the two stoppers 5 corresponds to the distance between the two shaft insertion holes 16. The arrangement for engaging the lid portion 3 and the end edge 12 is not particularly limited, and any one of various known constructions can be used. For example, projections 6a can be formed on the right and left ends of the end edge of the lid portion, and recesses 12a formed in those portions of the end edge 12 corresponding to respective ones of the projections 6a, thus providing a concave/convex engagement construction.

When the magnetic tape cassette 15 is to be placed in the case 1 of the above construction, the lid portion 3 is opened as shown in FIG. 1, and the cassette is inserted into the case 1 through the insertion and removal opening 13 or 14 in such a manner that the side face of the cassette is first introduced into the case 1. Then, the lid portion 3 is closed, thereby finishing the cassette insertion operation. In this cassette insertion operation, the magnetic tape cassette 15 can be properly inserted regardless of the orientation of the top and bottom faces of the cassette and regardless of the orientation of the front and rear faces of the cassette. Therefore, when inserting the cassette into the case, it is not necessary to pay attention to the insertion direction of the top and bottom faces of the cassette, as in the case of the prior art. Therefore, the operability of the case of the invention is much enhanced.

Although in the above-described embodiment the shaft insertion holes 16 corresponding to the respective hubs 17 are provided at positions slightly displaced from the centerline of the magnetic tape cassette 15, disposed centrally of the width thereof, the stoppers 5 may be designed so as to allow such position displacement. More specifically, each stopper 5 enters the shaft insertion hole 16 to engage teeth 17a of the hub 17, thereby holding the hub. The stopper 5 may, for example, be in the form of a projection which extends lengthwise in the longitudinal direction of the container case 1 and may be formed with an allowable size in the widthwise direction of the container case. Therefore, regardless of the orientation of the top and bottom faces of the magnetic tape cassette 15 when it is inserted, the stopper readily accommodates the position displacement due to the difference in the orientation of the top and bottom of the cassette.

When the magnetic tape cassette is to be removed from the case, the lid portion 3 is opened, and the cassette can be quite easily removed merely by slightly tilting the case in such a manner that the insertion and removal opening 13 or 14 is directed downwardly. For example, the container case 1 can be held in one hand and tilted in such a manner that the insertion and removal opening 13 is directed downwardly. In this state, by opening the lid portion 3 with a finger of the user's hand holding the case, the cassette can be easily removed from the case.

The lid portion 3 may be molded separately from the casing portion 2 and be connected thereto. Also, the lid portion 3 may be molded integrally with the casing portion 2. Using integral molding omits a conventionally required case assembly step during manufacture, thereby enhancing productivity. The casing portion 2 of the container case 1 is of an integral construction so as to entirely cover the front, rear, top and bottom faces of the magnetic tape cassette 15. This construction is excellent from the viewpoint of strength, and achieves excellent effects for protecting the cassette.

The container case 1 can be made using ABS resin, PS resin, PP resin, etc., as is the case of the prior art. However, in view of the durability of the hinge portion 4, it is preferred that the container case 1 be made entirely of PP resin having a high fatigue strength, or at least the hinge portion 4 be made of a synthetic resin such as PP resin.

Figure 2:
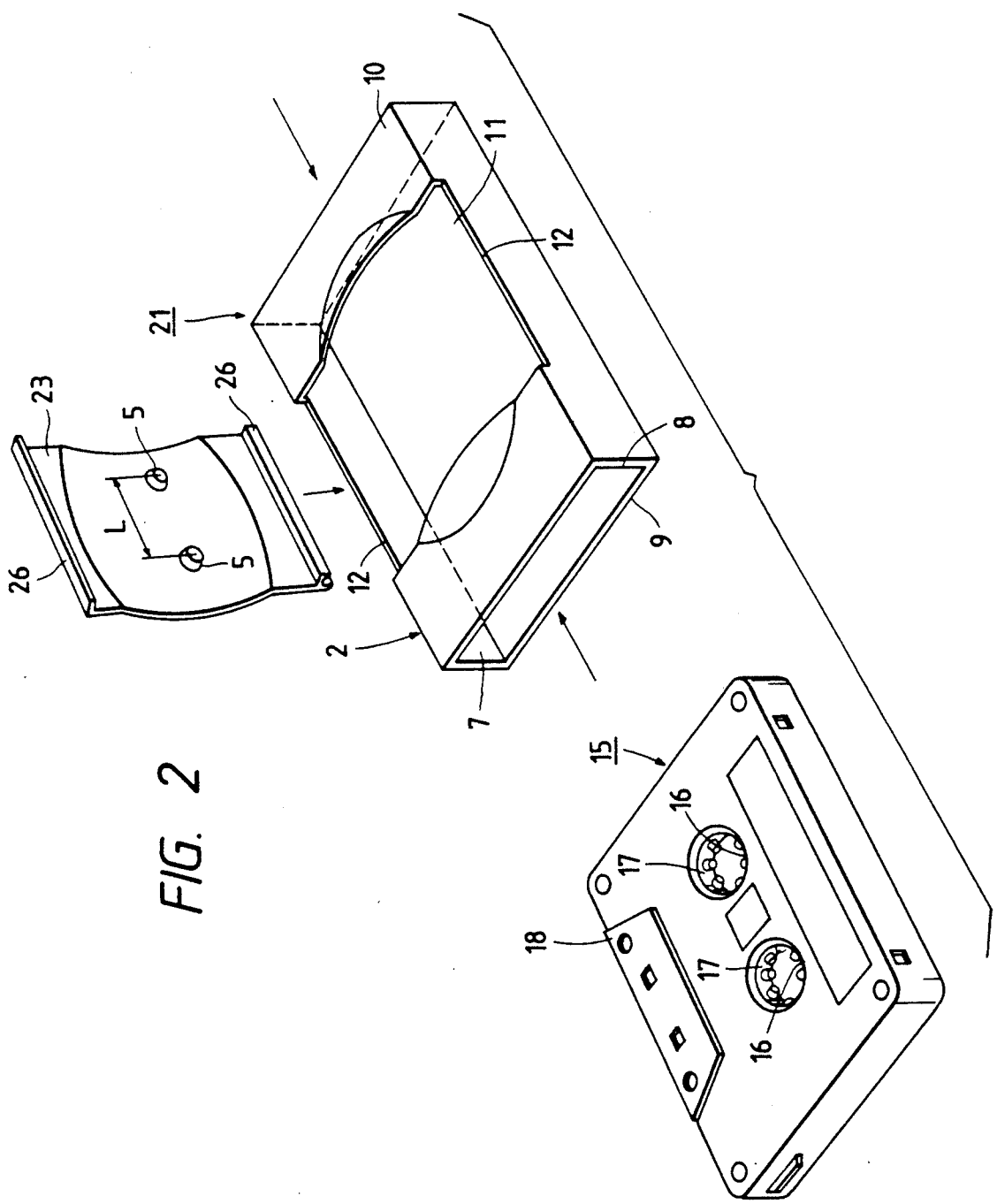
FIG. 2 is a perspective view showing another preferred embodiment of a cassette case of the present invention showing both a cassette case and a magnetic tape cassette to be housed in the case.
Figure 3:
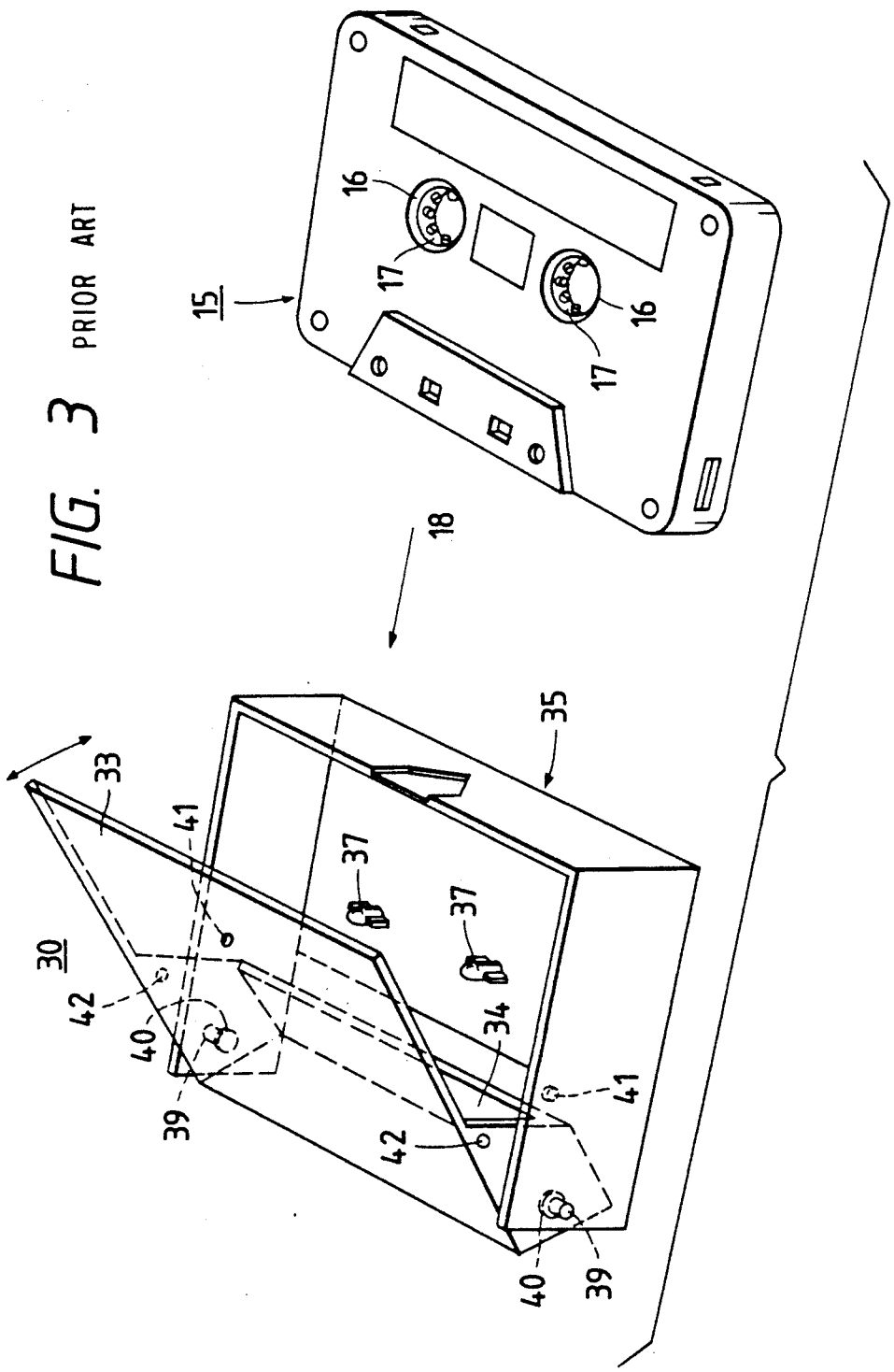
FIG. 3 is a perspective view of a conventional cassette case and a magnetic tape cassette to be housed in the case.

The present invention is not restricted to the construction of the above embodiment shown in FIG. 1, and a construction as shown in FIG. 2 can be employed. A casing portion 2 of a container case 21 shown in FIG. 2, like that shown in FIG. 1, has a space surrounded by walls 7, 8, 9 and 10 in four directions and is generally identical in size to the exterior of the magnetic tape cassette 15. Insertion and removal openings 13 and 14 at the left and right sides have a shape generally corresponding to the vertical cross-sectional shape of the side face of the magnetic tape cassette 15. However, a lid portion 23 has a pair of stoppers 5 for retaining hubs, and corresponds to a cut-out portion 11 in the wall 10 so as to form part of the wall 10. Further, its opposite end edges 26 extending in the longitudinal direction of the container case are engageable respectively with end edges 12 of the cut-out portion 11 so that the lid portion can be releaseably attached to the wall 10.

A different engagement structure between the opposite end edges 12 and the end edges 26 of the lid portion can be suitably provided, for example, by concave and convex portions provided at the opposed surfaces of the above end edges.

Like the container case 1 shown in FIG. 1, the container case 21 of the above construction achieves advantageous effects such as improved operability, improved productivity and an improved cassette protection function.

Although container cases for an audio magnetic tape cassette have been described above, the present invention is not restricted to such cases, and the present invention is applicable to a container case for a video magnetic tape cassette made of a plastic resin.

As described above, the container case according to the present invention comprises the casing portion having the space surrounded by the wall in four directions, the space being generally identical in configuration and size to the exterior of the magnetic tape cassette to be received in the case, the right and left sides of the casing portion being open to provide the insertion openings each having a shape generally corresponding to a vertical cross-sectional shape of the side face of the magnetic tape cassette, and the pivotally openable lid portion having the pair of stoppers for retaining the hubs, and provided on the wall for movement between an open and a closed position so as to form part of the wall. The lid portion having the stoppers can be releaseably attached to the wall.

With such construction, insertion of the magnetic tape cassette into the container case can be done through either of the two openings. The magnetic tape cassette can be properly placed in the container case regardless of the orientation of the top and bottom faces of the magnetic tape cassette and regardless of the orientation of the front and rear faces of the cassette. Therefore, when placing a cassette in the case, it is not necessary to pay attention to the orientation of the top and bottom faces of the front and rear faces of the cassette, as is the case with the prior art. Therefore, operability is much enhanced.

In the present invention, when the magnetic tape cassette is to be removed from the container case, the lid portion is opened, and the cassette can be quite easily removed merely by slightly tilting the container case in such a manner that the opening is directed downwardly. For example, the container case can be held in one hand and suitably tilted. In this condition, by opening the lid portion with the finger of one hand holding the container case, the cassette can be easily removed from the container case. Further, the lid portion can be molded integrally with the casing portion, in which instance a conventionally required case assembly step can be omitted, thereby enhancing the productivity of the container cases. Further, in the container case of the present invention, the casing portion is of an integral construction so as to entirely cover the front, rear, top and bottom faces of the magnetic tape cassette. Therefore, the container case has a greatly improved strength compared with a conventional container case, thus enhancing the cassette protecting function.

What is claimed is:

1. A case for a magnetic tape cassette, the magnetic tape cassette having front and rear faces, top and bottom faces and right and left side faces, the magnetic tape cassette having a pair of hubs disposed in corresponding insertion holes extending between the front and rear faces, said case comprising: a casing portion comprising four walls surrounding on four respective sides a space of substantially the same configuration and size as the exterior of the magnetic tape cassette, said four walls including first and second walls corresponding respectively to the front and rear faces of the magnetic tape cassette, and third and fourth walls corresponding respectively to the top and bottom faces of the tape cassette, right and left sides of said casing portion being open to provide insertion openings each having a shape corresponding to the vertical cross-sectional shape of either of said right and left side faces of the magnetic tape cassette; and a pivotally openable lid portion having a pair of stoppers for retaining the pair of hubs and being provided in a cut-out portion of one of said first and second walls for movement between an open position and a closed position, wherein said lid portion forms part of one of said first an second walls.

2. The case for a magnetic tape cassette according to claim 1, wherein said lip portion is releasably attached to said casing portion.

3. The case for a magnetic tape cassette according to claim 1, further comprising a concave portion formed along an edge of said lid portion and a convex portion formed along an edge of said casing portion for releaseably attaching said lid portion to said casing portion.

4. The case for a magnetic tape cassette according to claim 1, in which said lid portion is hingedly attached to said casing portion.

5. The case for a magnetic tape cassette according to claim 1, wherein said lid portion comprises engagement means at a free end thereof to engage said free end with said casing portion.

6. The case for a magnetic tape cassette according to claim 1, wherein said stoppers have the form of a projection elongated in a longitudinal direction of said case.

7. The case of claim 1, wherein said case is made of a material comprising a group consisting of ABS resin, PS resin, and PP resin.

* * * * *